United States Patent [19]

Raye

[11] Patent Number: 4,580,218
[45] Date of Patent: Apr. 1, 1986

[54] INDEXING SUBJECT-LOCATING METHOD

[75] Inventor: Carol L. Raye, Middlesex, N.J.

[73] Assignee: AT&T Bell Laboratories, Murray Hill, N.J.

[21] Appl. No.: 530,387

[22] Filed: Sep. 8, 1983

[51] Int. Cl.⁴ .............................................. G06F 15/20
[52] U.S. Cl. ................................................... 364/300
[58] Field of Search ................................ 364/300, 419

[56] References Cited

U.S. PATENT DOCUMENTS 3,947,825  3/1976  Cassada ............................. 340/172.5

OTHER PUBLICATIONS

Rudin, Bernard, "Computer and Information Sciences-II", *Proc. Of The Second Symposium On Computer And Information Sciences,* 1967, pp. 291–301, L71401200.
Proc. of the American Documentation Inst. 1966 Annual Meeting, vol. 3, (1966), "Computer-Assisted Index Preparation," G. J. Carney, pp. 329–338.
Information Storage and Retrieval, vol. 6, 1970, "Experiments in Book Indexing by Computer," H. Borko, pp. 5–16.
Information Processing and Management, vol. 13, 1977, "Automatic Recognition of the Parts-of-Speech for English Texts," J. M. Janas, pp. 205–213.

*Primary Examiner*—Raulfe B. Zache
*Attorney, Agent, or Firm*—Charles Scott Phelan

[57] ABSTRACT

A determination is made as to whether or not each word of a segment of a body of text is included in one or more multi-word subjects of a list of subjects included in the text. If a subject word is found, a further determination is made as to whether or not all words of the subject are included in the same segment. A subject, as to which all words are in the same segment, is associated with text-locating indications for indexing purposes. Routines are also shown for updating a window portion of a textual manuscript for indexing purposes, searching a word list for matches and forming an active list for words which match, performing approximate root matches, and determining from an activated word match which subjects of a subject list are found in their entirety in a manuscript text.

12 Claims, 7 Drawing Figures

INDEXING SUBJECT-LOCATING METHOD

BACKGROUND OF THE INVENTION

This invention relates to the indexing of textual material, and it relates more particularly to a method for locating subjects during indexing of a manuscript.

Many documents could be made more useful by the addition of a subject-page (or back-of-the-book) index. This is particularly true of reference documents where, often, the reader wants the answer to a specific question quickly. In this case, a table of contents will be somewhat helpful; but, typically, a table of contents does not have the level of detail that a subject-page index has. However, producing a back-of-the-book index manually is difficult and time-consuming.

In order to produce an index manually, a person typically reads through the manuscript circling subjects as they appear in the text. Often, someone else then transfers each subject and the page number to index cards. Page numbers are collated, and the subjects alphabetized to produce a subject-page index. Of course, if the document is altered, and the page numbers change, the index will have to be changed also.

Several references, discussed below, illustrate the types of work which have been done in the indexing field. G. J. Carney has published an article entitled "Computer-Assisted Index Preparation," which appears at pp. 329-338 in *Proceedings of the American Documentation Institute 1966 Annual Meeting*, Vol. 3 (1966). Carney actually uses a human indexer to whom the system presents a display of significant words of a text in sentence context, and along with the page numbers thereof. The indexer reviews such words and selects desired items for the index. An article by H. Borko entitled "Experiments in Book Indexing by Computer," appearing in *Information Storage and Retrieval*, Vol. 6, pp. 5-16, Pergamon Press, 1970, shows a one-pass system which generates an index while also generating the subjects used in the index. However, final selection in that arrangement was accomplished by a human, because no algorithm had been found that would not include phrases of little or no read utility for index users. A J. M. Janas article, "Automatic Recognition of the Part-of-Speech for English Texts," appeared in *Information Processing and Management*, Vol. 13, pp. 205-213, Pergamon Press, 1977. Janas does not deal directly with the problem of preparing an index from a subject list; but the author does discuss briefly the idea of recognizing parts of speech using, in part, word endings which are characteristic of the parts of speech. A U.S.A. patent to Cassada, U.S. Pat. No. 3,947,825, deals with an index search machine which compares abstracts of groups of words in stored information with an abstract of a user search request. Only a comparison showing a match causes the corresponding words underlying the abstracted material in the store to be searched in detail.

The task of indexing can be partly eased if a manuscript is prepared with a text processor, such as that represented by the known troff and nroff text processors available with the UNIX ™ operating system licensed by the American Telephone and Telegraph Company. In this case, the author, with a subject list in hand, inserts a macro along with the name of a subject each time that the subject appears in the text. When the document is formatted, the macro separately prints the subject name and the page number. Page numbers still must be collated, and the subjects alphabetized; but those two functions can be performed by known techniques. In this way, it would be easier to recreate the text if the document were altered significantly and page numbers changed. However, the user still must decide which combinations of words constitute an occurrence of a particular subject and try to locate every occurrence of every subject in the document.

SUMMARY OF THE INVENTION

Occurrences of a subject in a manuscript are located in accordance with the present invention by considering successive n-sentence segments of a body of text. A determination is made as to whether or not each word of a segment is included in one or more subjects of a subject list. If such a subject word is found, a further determination is made as to whether or not all other words of the subject are included in the same segment. A subject, as to which all words are in the same segment, is associated with text-locating indications for indexing purposes.

BRIEF DESCRIPTION OF THE DRAWINGS

A more complete understanding of the invention and the features, objects, and advantages thereof may be obtained from a consideration of the following detailed description in connection with the appended claims and the attached drawing in which

DETAILED DESCRIPTION

Figure 1:
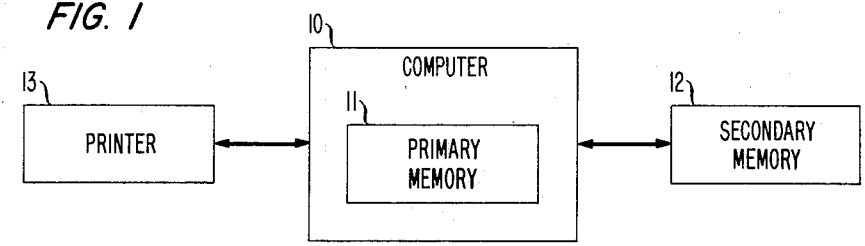
FIG. 1 is a simplified equipment diagram illustrating an arrangement of equipment in which the subject location method of the invention can be carried out.

FIG. 1 is a diagram of an illustrative hardware arrangement for utilizing the method of the present invention. In that figure, a general purpose computer 10, having a primary memory 11, is provided for cooperating with a secondary memory 12 for bulk information storage, and a suitable printer, or other outputting arrangement 13. Computer 10 is a suitable general purpose computer such as, illustratively, either a 3B20S computer of the Western Electric Company or a Vax 11/780 computer of the Digital Equipment Corporation. Either computer is capable of operating with the aforementioned UNIX operating system, which is one illustrative operating system upon which the invention described herein can run. Not shown in FIG. 1 are other input/output-type peripheral equipment units, e.g., a keyboard and display terminal, for the computer 10. This is because human intervention is not required once the system has been started with the manuscript and subject list database elements to be mentioned. By way of background, the UNIX operating system, including the aforementioned troff and nroff basic text formatters, are described in greater detail in a group of papers constituting the July-August 1978 issue of the *Bell System Technical Journal*, Vol. 57, No. 6, Part 2.

Figure 2:
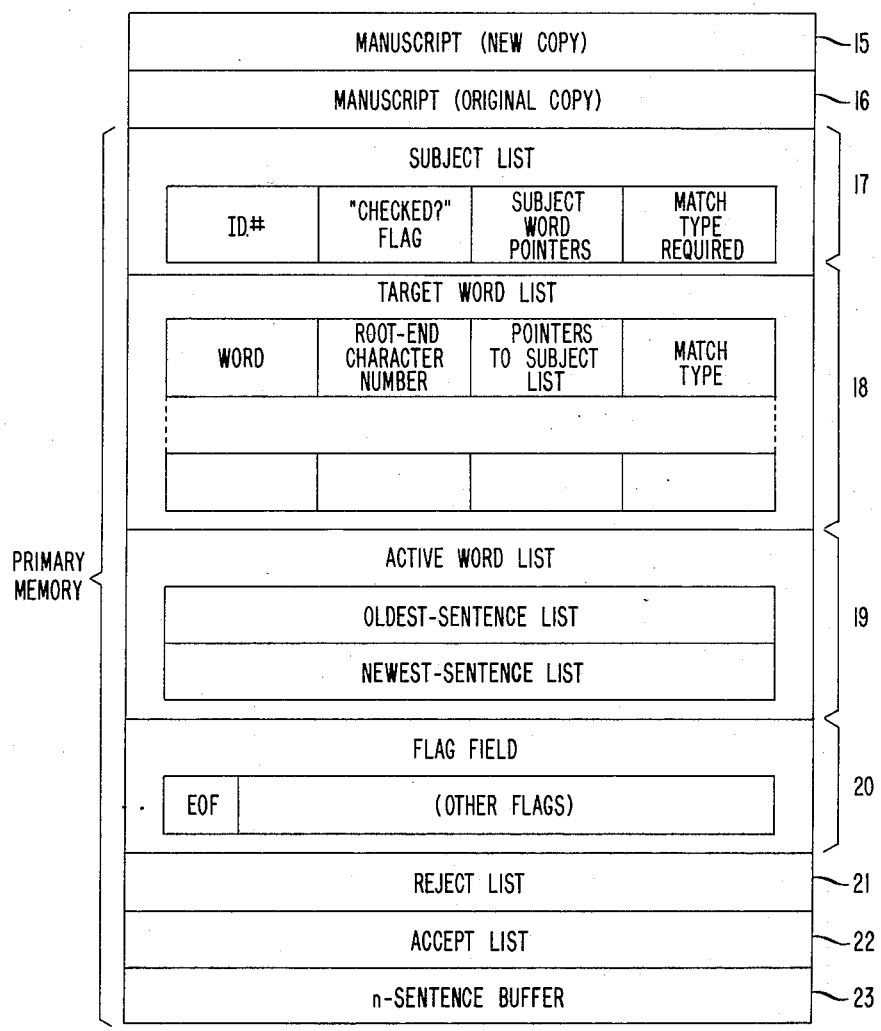
FIG. 2 is a memory map of relevant portions of memory of the equipment of FIG. 1 and utilized in conjunction with the invention.

FIG. 2 is a memory map of parts of the primary memory 11 and secondary memory 12 which are employed in describing the illustrative embodiment of the invention. The parts illustratively assigned to the primary and secondary memories, respectively, for one embodiment will be indicated as the description of the process diagrams of FIGS. 3–7 proceeds.

Figure 3:
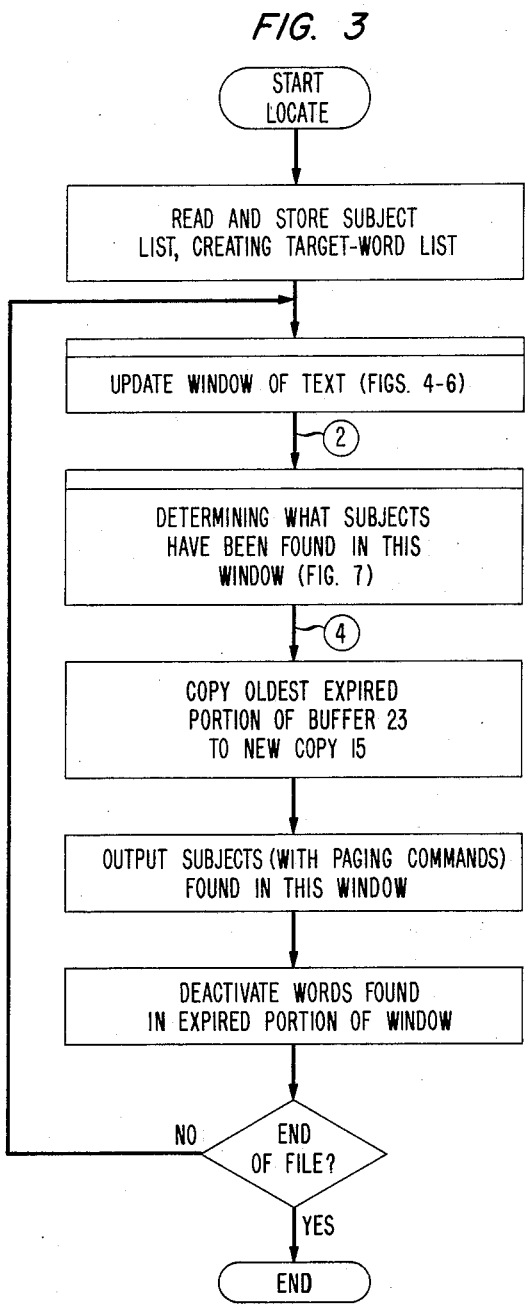
FIG. 3 is an overall process flow diagram for the subject location method of the invention.

FIG. 3 depicts a process flow diagram for the overall subject-locating method of the present invention. The process represented there searches a manuscript text, stored in a Manuscript (original copy) field 16 in the memory map of FIG. 2, for all subjects of a previously generated subject list, stored in a Subject List field 17, to identify locations of those subjects. That information is then used by means, which are known in the art and comprise no part of the present invention, to produce an actual alphabetized index of the subjects with their respective page locations in the manuscript from which the subject list was generated.

The first step in the process of FIG. 3 is the reading and storing in memory field 17 of the list of subjects that may be contained in the manuscript. That field includes for each subject, in addition to pointers to its words in a target word list, its identification number, a binary flag to indicate whether or not it has been checked by the subject-locating process, and a flag indicating the type of match required for it to be considered that the subject is found in the manuscript. For purposes of illustration, a literal match, i.e., of all letters of a word and type case of the letters, may be required by the provider of the subject list; and that requirement is indicated by the state of the match flag. The subject list will have been initially provided either from the output of another program or by a user in the form of new input through, for example, a computer terminal (not shown). Each word of each subject is separately stored in a target word list field 18 in FIG. 2 one time. At the same time that a subject word is first so stored, the process stores a pointer to the word with the subject in the subject list 17 and stores a corresponding pointer to the subject list location with the word in the target word list 18. If a word was already stored in the target word list for a previous subject, a pointer to the current subject location in field 17 is added to the target word list field 18; and a pointer to the word location in the target word list field is stored with the current subject in the subject list. In addition, the portion of the word which represents a root thereof is determined; and the number of characters in the root is stored, along with the word, in the target word list. This information will be utilized in later processing. Methods for determining the root of the word and the location of the end character thereof are well known in the art. One example would be an adaptation of the suffix phase processing described in *Computer Science Technical Report*, No. 81, "PARTS—A System for Assigning Word Classes to English Text," by L. L. Cherry, June 1978, Bell Telephone Laboratories, Incorporated. A match-type flag is also included with each word of the target word list to indicate the highest ranked, i.e., the most specific, type of match used so far in the processing of a manuscript sentence to match a window word and a target word. For the illustrative embodiment, the highest ranked match type is a literal match; the next is a case match in which the case of the window word is forced to lower case before a literal match is performed; and the last is a root match in which a root of a lower case window word is compared to the root of a target list word. The target word list is stored in the primary memory 11.

All text of the manuscript to be indexed is advantageously searched to locate subjects by considering segments, or "windows," of a size of n sentences. Sizing the window in terms of sentences provides a close tie to a human author's thought process. It has been found that this technique makes the best use of the human intelligence, which has already been input to the subject list, and which is to be later input by an index user. The particular size to be employed for the window will depend on various factors, such as the type of manuscript, the length of the manuscript, and perhaps to some extent, an author's writing style. Typically, if the size of window is too small, a number of subject locations will be missed. On the other hand, if the window is too large, it will be found that false hits occur; that is, there will be false indications of the presence of a subject, simply because the words are found in the window, but they are so widely spread through the text in the window that they do not actually represent a unified subject in the context. It has been found by trial and error that a good size for a manuscript of more than 12 pages, for example, and dealing with a nontechnical subject, is a value of $n=2$. That is the value for n, which is illustratively employed in the subsequent description of the present invention.

After creating the target word list, as previously mentioned, the window for consideration is selected and updated as required. Processes for updating will be considered in detail in connection with FIGS. 4–6. For reader convenience, however, they are here summarized. The initial operation is to select the first n-sentences, on a word-by-word basis, to be used in the window. Thereafter, the sentence combination, e.g., a pair for $n=2$, is changed as the search progresses. All words of those sentences, that is, both of the sentences of the illustrative window, are considered in connection with the full target word list. Pointers to words found on the target word list are placed on an active word list in field 19 of FIG. 2; and, hence, that function, in effect, places the found word on the active list. Accordingly, for convenience of description, that placement of a pointer on an active word list will hereinafter usually be cited simply as either putting the found window word on the active list, or activating the word. As each word from the manuscript field 16 is considered, it is also copied to an n-sentence buffer 23.

After a current two-sentence window has been processed, a third sentence is considered, word-by-word, as part of a new two-sentence window. That new window is then considered in connection with the entire target word list; and this procedure is repeated over and over again, although, in any one pass through the illustrated subject-locating routine, only one window is considered at a time.

The next step in the process of FIG. 3 is to determine what subjects have been found in the current window on the manuscript during the foregoing step of updating the window on the manuscript text. Each of the words on the active word list of an expired sentence (i.e., oldest sentence list) in the field 19 of the memory map is checked, by way of its entry on the target word list 17, to identify each of the subjects in which the active word is found. For each subject so determined, all of the other words of that subject are searched for in all parts of the active word list for the current window to see whether or not, e.g., they are found there. If any other word of a subject is not found on the active word list, the subject is placed on a reject list (field 21) and dropped from further consideration with respect to this window of the manuscript. However, if all words of a subject are found on the active word list, then the subject is placed on an accept list (field 22) to indicate that it is available to be outputted. Any subject considered is marked as checked ("checked?" flag set) and not reconsidered in the current window.

After all subjects represented in the current window have been identified from the review of the active word list in the determining step, the oldest sentence of the window, contained in the n-sentence buffer 23 previously mentioned, is then output to secondary memory 12 along with the identified subjects. This outputting, or recording, is accomplished by transferring to the Manuscript (new copy) field 15 of the secondary memory 12 a statement which is placed at the end of the last-transferred sentence in the new copy of secondary memory. This statement identifies the subject by its identification number, and includes a paging command to a text processor program, such as nroff or troff, when it is later formatting the new copy of the manuscript. Execution of that paging command causes the writing in a further file of both the identification number of the identified subject and the page number which the text processor assigns to that manuscript location. As subjects on the accepted list are output, the "checked?" flag (field 17) is reset for each subject. Next, the "checked?" flag (field 17) is reset for subjects on the reject list; and the accept and reject lists are cleared.

Following the output of the subjects found during consideration of the window currently under examination, the words found in an expired portion of the window are deactivated. The expired portion of the window is simply the oldest of the n-sentences in the window, and the deactivation of the words for the corresponding part of the active word list 19 in FIG. 1 involves, for each word on this portion of the active word list, resetting the match type of the corresponding target list word to "none" and erasing the portion of the contents of the active word list relating to that oldest sentence.

Finally, a test is made to determine, following deactivation of the words found in the expired portion of the window, whether or not the end of the file has been reached, that is, whether or not the process has reached the end of the manuscript original copy in field 16. If the end has been reached, the subject-locating process is at an end. However, if the end of the manuscript file has not been reached, the process loops back to update the window on the manuscript and repeat the updating, determining, outputting, and deactivating steps just outlined.

Figure 4:
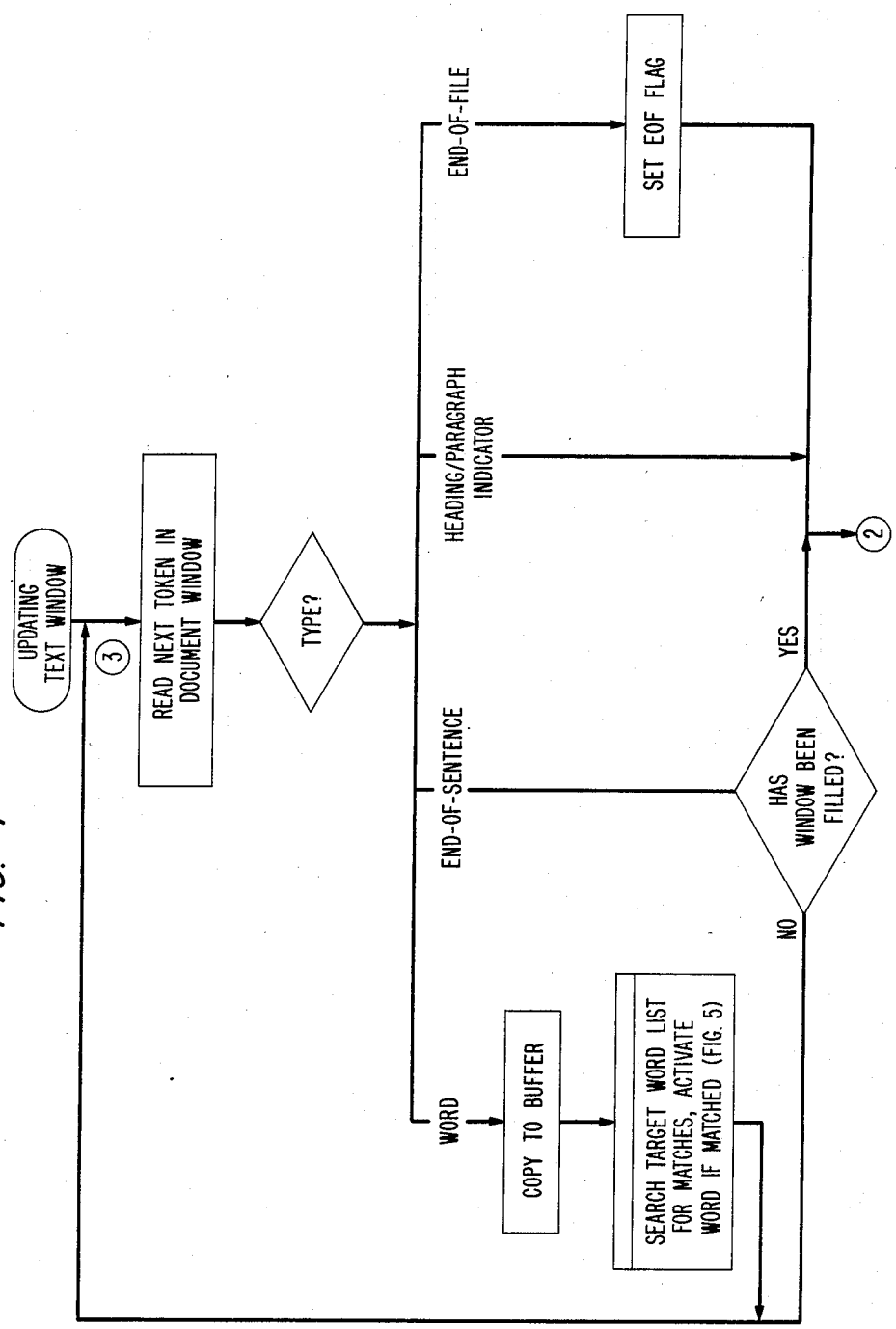
FIGS. 4 through 7 are process flow diagrams in greater detail for several routines utilized in the process of FIG. 3.

FIG. 4 illustrates, in greater detail, the process for updating a window on the manuscript text. This process involves adding a new sentence to consideration in the overall process. This addition is accomplished on a word-by-word basis, activating words found as the process is carried on. Consequently, in this arrangement, it is not necessary to extract from memory an entire sentence, or even an entire n-sentence window, to be stored in primary memory while the extracted information is being evaluated for subject locations.

Operation of the process of FIG. 4 is measured by the duration of a particular current sentence under consideration. The first step in the process of FIG. 4 is to read a first, or next, token from the manuscript field 16 in FIG. 2 into the primary memory area 11 for examination. Token types involved in the process are the actual words of a sentence and structural indicators which inform the process that the end of a sentence has been reached. Those structural indicators include, for example, an end-of-sentence indicator, such as the machine-readable character for a period, a heading or paragraph indicator represented by a corresponding formatting character stored in the manuscript field, or file, along with the text words, and an end-of-file indicator.

The next step in the FIG. 4 process is to test the new token to determine the type of token which is represented. This is done, for example, by a character-matching process to determine whether or not one of the indicated structural-type characters has been found. If none of them is found, then the character is assumed to be either a character of a word or numeral or some other character of no different significance in accordance with the process of FIG. 3. Consequently, one or more such characters found between space characters are processed as though they were a word.

If the new token is found to be a period-type of punctuation character, indicating the end of a sentence, a test is made to determine whether or not the current window on the manuscript has been filled. In other words, a test is made to determine whether or not n sentences have been completed in the current window. If the window has not been completed, i.e., if n=2 in the present illustration has not been reached on a sentence counter, the process loops back to read the next token. However, if n=2, the window has been filled; and the process then returns to location 2 in FIG. 3 to process any words that may have been activated before beginning a new window.

If the type test indicates a heading or a paragraph character for formatting, then anything that follows such a character is unlikely to correlate, subjectwise, with any prior sentence in the current window. Accordingly, the process then returns to the main program at point 2 in FIG. 3. The reason for returning to the main process is that the heading or paragraph indicator means that examination has been completed for a logical topical unit in the manuscript being indexed. Accordingly, it is then necessary to complete the processing of what has been found in terms of subjects having at least one word in any of one or more sentences remaining in the current window before continuing to update the window. If n were greater than two, the processing is carried out separately in succession for each remaining sentence.

If the token-type test shows an end-of-file (EOF) formatting character, then the process sets a flag to indicate that fact. This EOF flag is set in primary memory, and it is part of a memory flag field 20 indicated in FIG. 2. After setting the flag, the process then returns to the main process in FIG. 3 to begin the aforementioned subject-determining step. Other steps in the main process of FIG. 3 are completed until reaching the end-of-file test; and, at that time, the main process tests the EOF flag, which has been set in the current portion of the window updating process of FIG. 4.

If the new token, taken from the manuscript file 16 is shown on the token-type test to be a word or a numeral or some other one or more characters between spaces, the process then copies the word into the primary memory buffer 23 for convenience of associating subjects and their locations with the first sentence in which a word of the subject appears in cases where n is greater than unity. That buffer is large enough to hold all n-sentences of a current window. Next, the process searches the target word list field 18 in FIG. 2 to determine whether or not the new word matches any word on the target word list. If a match is found, the new word is activated (placed on the active word list); and the subroutine for looking for a match and activating a new word will be considered in greater detail in connection with FIG. 5. If no match is found in the comparison with words of the target word list, no further consideration is given to that new word; and it is simply dropped from further consideration at this point. It is not necessary to mark it or store it in any fashion, since it is assumed that, if the same word is found again within the current sentence, or in either sentence of the current window, it will be totally reprocessed as a new token in accordance with the whole process of FIG. 4.

Upon completing the search of the target word list in connection with the new word, the process loops back to the beginning of the subroutine in FIG. 4 to read a new token from the manuscript file 16. Meanwhile, all words on the active list are retained there until the window has been filled; and then, the main process of FIG. 3 is resumed, as previously indicated.

Figure 5:
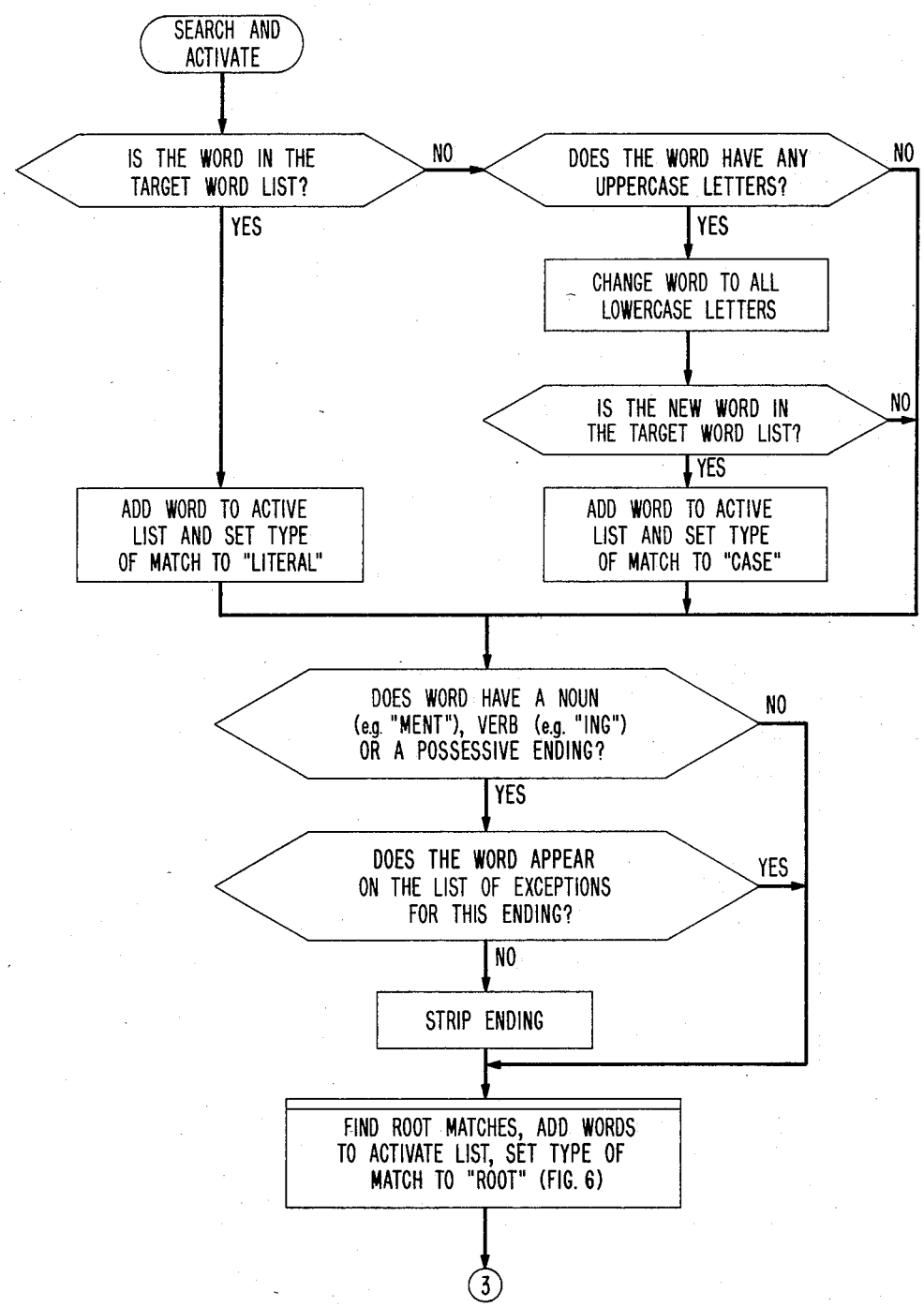

FIG. 5 illustrates, in greater detail, the subroutine for searching the target word list and activating words matched in the step of corresponding name in the FIG. 4 process for updating the window on the manuscript.

In the course of the process of the present invention, there are a number of occasions when it is necessary to match the characters of one word against the characters of another word to determine whether or not they are alike, or at least similar. For this purpose, three different matching processes are advantageously employed; and these are a literal match, in which every character of a first word must match every character of a second word, both in character type and in number of characters, in order for a match to be obtained. A second type of match is a "case" match in which any uppercase letters in the text word are changed to lowercase, and every character in the two words match. A third type of match is called a root match; and, for this type, the literal root of a word, that is, the most meaningful beginning portion of letters of the word, must match on a character-by-character, i.e., on a literal, basis in order for a match to be indicated. A root match occurs if the roots match, regardless of whether or not both words have matching suffix portions. Another type of root match is an approximate root match; and, in this type, for certain situations which will be described, a root match is accomplished on only a predetermined initial portion of the characters of the word root.

Accordingly, to keep track of the type of match which is being utilized, the memory map includes, in the target word list field 18 thereof, an additional match-type flag. That flag is simply a character indicating the type of match used by the process. This match-type character represents one of the literal, root, or case match types. Thus, in the FIG. 5 search and activate operation, which will be described in detail, the process first attempts a literal match; and, if this fails, it attempts a case match. Next, it looks for root matches. When any match is made, the process sets the corresponding match-type flag in the FIG. 2 memory map.

In FIG. 5, the first operation is to test the word selected from the current sentence of the manuscript window to determine whether or not the word has a counterpart on the target word list 18 in FIG. 2. This test involves a literal match. If the test produces an affirmative result, a test is run to determine whether or not the word on the target word list is already on the active word list for the current sentence. If it is, the match-type used to find the window word on the target word list is substituted in the target word match flag if it is of higher rank. If the target word is not already on the active word list for the current sentence, a pointer to the target list word corresponding to the new word from the current sentence of the window is added to the active list field 19 in the memory map. That list has an oldest-sentence list, for words found in the oldest sentence of the current window, and a newest-sentence list, for words found in the current sentence of the current window. The "oldest" and "newest" characterizations change after each deactivation operation. When a word is newly activated, it is always placed on the active word list newest portion dedicated to storage for the current sentence of the window. This action is called "activating the word;" and it simply indicates, as previously noted, that the manuscript words which are found to be included on the target word list are noted as pointers to appropriate target word list field 18 locations. Those pointers are held on an active word list in field 19 for further processing.

After having added a word, that is the new word from the current sentence, to the correct active list part, the match-type flag on the target word list is set to literal to indicate that that is the type of matching that was just completed. This match-type information will be used in subsequent processing to be described. Thereafter, the process will continue with some word root testing, to be described.

Returning to the FIG. 5 target word matching test, a negative result, i.e., no match, for that test causes the process to make a further test to determine whether or not some particular characteristic of the word is concealing an otherwise matching context. For example, if a word from the current sentence of the window has one or more uppercase characters, and no corresponding word on the target word list includes capital letters, then a negative result on the literal word match would have been produced. Accordingly, a test for uppercase letters is made. If the current window word is found in this letter-case test to have no uppercase letters, the process then resumes with the word root testing, as previously mentioned. However, if there are one or more uppercase letters in the word, the process then changes all characters to the lowercase format and, again, conducts a literal test to determine whether or not the new word, in its lowercase form, is on the target word list. If the new word is still not on the target word list, the process moves on to the word root testing, as previously mentioned. However, in the affirmative case, if there is a match with the target word list, a pointer to the target word matched is added to the current sentence active word list; and the type of matching is set to case before the process picks up with the word root testing.

Root processing in the FIG. 5 flow diagram operates on every token identified as a word in the FIG. 4 process, whether or not it matches a target list word. A first test in the root processing determines whether or not the word, that is, the current new word from the current sentence of the window, has a noun (e.g., "-ment"), verb (e.g., "-ing"), or a possessive ending. This type of test is advantageously accomplished by using a suffix table of the appropriate suffixes indicated above, and performing a literal match for each suffix on the table with the same number of final characters in the new word from the window which is currently being examined. A similar suffix-comparing operation is indicated in the aforementioned Cherry Technical Report No. 81, and an illustrative table of suffixes is included in the Appendix 3 thereof. However, in the present process, it is necessary for indexing purposes to use only three types of endings, i.e., those just indicated and including the typical possessive types of endings. The possessive-type endings comprise the possessive suffix of apostrophe or apostrophe s. If the new word does not have one of the indicated endings, then the process performs a root match, using the entire window word as a root, as will be described.

If the suffix screen test produces an affirmative result, then the screened word is checked against a dictionary of exception words to determine whether or not the word appears in a list of exceptions for the same one of the endings used in the screening test just described. This test is accomplished by using a dictionary of words, e.g., as in the Cherry paper, all of which end with the characters in one of the aforementioned endings, but for which these characters are not a suffix, but rather part of the root of the word. For example, in the word "string," "ing" is not a suffix. If this exception list test produces an affirmative result, a root match is conducted, using the entire window word as a root, as will be described.

However, if the exceptions screen test produces a negative result, the process then strips off the window word ending and, using the remaining root, performs a root match to determine whether or not the root of the stemmed word has one or more corresponding appearances as a word on the target word list. It is necessary, in this case, to ignore the suffix, or ending portion, of the target list word involved, so that only the remaining stem, or root, will be matched. If the two roots match character-by-character, the root match flag is set. More detail on this root match operation will be described in connection with FIG. 6. Following the root match operation, the process returns to the point 3 in the calling routine of FIG. 4 to select a new word from the manuscript portion in the current window.

In the previous discussion of literal, case, and root match operations, it was assumed that, after a match was found, the window word was activated. However, in order to avoid the collection of unnecessary data, a match is followed in each operation by a test to determine whether or not the same target list word is already pointed on the active list of the current sentence. If not, the activation proceeds as described. If a pointer to it is already on the active word list, the match-type just used to associate the window word and the target word is compared to the match-type at the target list word; and, if the former match-type is of the higher, i.e., more specific, rank, it is substituted in as the new target word match-type. Thus, literal would be substituted for either case or root, and case would be substituted for root. The process then continues with no further activating processing being required.

Figure 6:
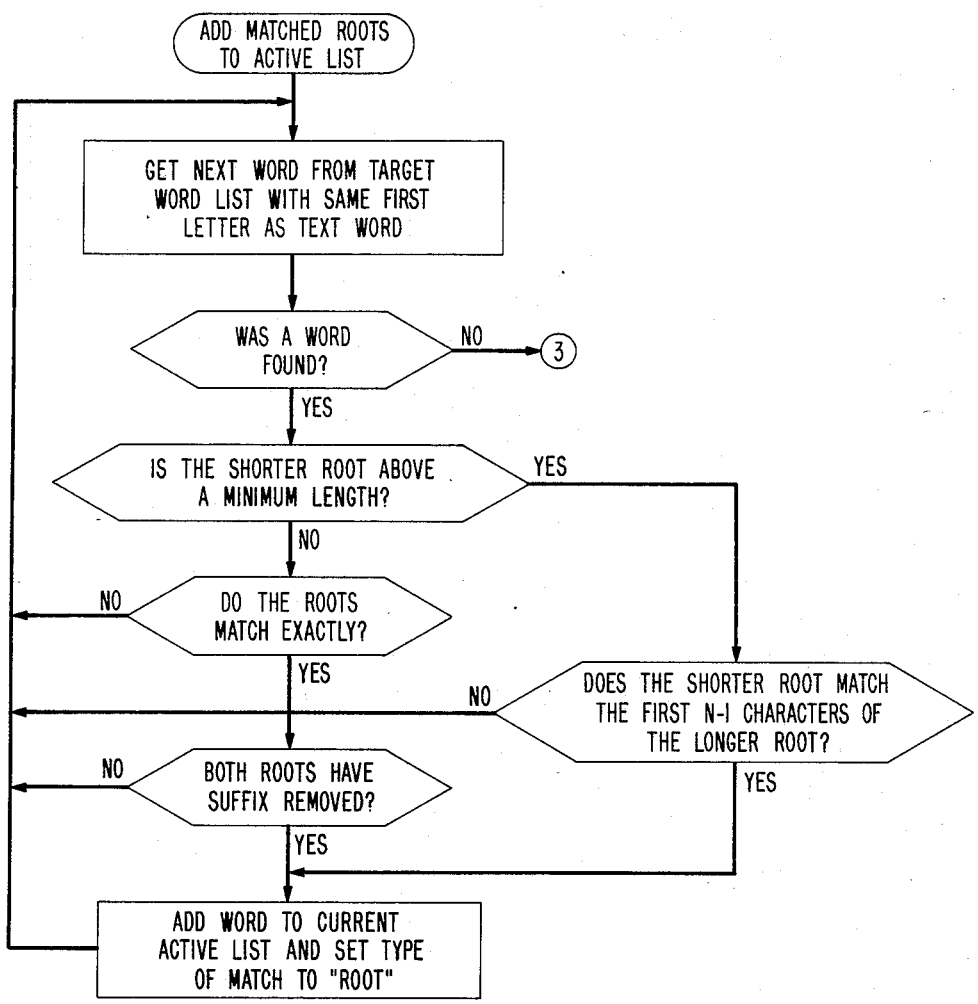

FIG. 6 illustrates a subroutine for finding root matches and adding words with root matches to an active list, and it is the subroutine advantageously employed for that purpose in the search and activate subroutine of FIG. 5. A word whose root is received for the FIG. 6 process either has an appearance on the active word list as a word having a literal match with a word on the target word list, or it has been found to have a literal match after having been reduced to lower case, or it is a word that does not satisfy either of the foregoing. Root matches are important for producing an adequate index, because most subjects are likely to have alternate syntactic forms of significant indexing value. Although the human indexer probably equates the terms "system design" and "designing systems" on their semantics, the human process can be approximated by equating certain syntactic variations through stemming. It should be noted at this point that a word having a literal match on the target word list from the beginning half of the process of FIG. 5 may, after stemming by suffix removal, nevertheless also have a root match appearance on the target word list. For example, a word like "writing" could have an appearance in its full literal text, "writing," as well as in a stemmed version, such as "write." Accordingly, in FIG. 6, the process now checks the window word to determine whether or not a root form thereof has a corresponding root appearance on the target word list.

As a first step in the subroutine of FIG. 6, the words of the target word list are examined to select the first occurring one thereof which has a first character, which is the same as the first character of the word being processed. This operation is performed to reduce run time for this subroutine since, obviously, a good many of the words on the target word list usually will not need to be examined. When the first word has been selected, its location on the target word list is noted so that the process can later return to that point to resume a scan of the target word list looking for additional words having the same first character as the word under examination. If no first-character match is found, the process returns to the calling program at the point 3 in FIG. 4 to select a new word from the current sentence of the current window on the manuscript. However, if a word is found, the process then proceeds to the question of a root match on the target word list.

The first step therein is to test the shorter one of the two roots to determine whether or not its size is above a predetermined minimum length. If the two roots are of the same length, the root of the word from the window, which has just passed through the FIG. 5 stemming process, is assumed to be the shorter of the two for further processing.

If the minimum-root-size test produces an affirmative result, the process then conducts a further test, which is an approximate root match, to determine whether or not the first $N-1$ characters of the longer N-character root match the first $N-1$ characters of the shorter root. Only the first $N-1$ characters of an N-character longer root are considered in this match. A final character, or letter, of a word is often changed when an ending is added, for example, "glorify" and "glorified." Consequently, the final character of a root is often irrelevant for word matching purposes; but the rest of the root is useful. If the approximate root match test produces an affirmative result, the target list word is added to the active list portion for the current, or newest, sentence of the active list; and the match-type is set to root match, as previously mentioned. However, if the approximate root match produces a negative result, the process loops back to obtain a new word from the target word list and having the same first character as the word from the current sentence of the window.

The minimum-length test is employed, because roots of a size less than a predetermined minimum have a greater likelihood of producing an incorrect affirmative result on an approximate-root match test. For example, if the approximate-root test were applied to the roots "cak" and "car" of "caked" and "cared," they would match. The optimum value of the minimum is likely to change, depending upon the subject matter or style (e.g., readability grade level) of the manuscript; and, for purposes of illustration, it has been found, for example, that a value of four or five characters produces suitable results for manuscripts dealing with subjects such as text indexing, which is here under consideration.

If the result of the minimum-root-size test is negative, i.e., if the shorter of the two roots is not greater than or equal to the predetermined minimum length, the process conducts a further test to determine if the two roots match exactly in both number of characters and type of characters. If the result of this test is affirmative, a further test is performed to determine if the two roots are both the product of stemming. This is done, for example, by comparing the length of the root to the length of the original word in each case. It should be noted that either the word from the text or the word in the target list may have had no suffix. For example, if the text word is "using," and, after stemming, its root is "us," and the target list word is "us" with no suffix, it would be inappropriate to call these two a match. However, if the target list word is "used," with the root "us," it is appropriate to say that its root matches the root of the text word "using." Thus, if it is determined that both roots are the product of stemming, the target list word is added to the portion of the active list for the current sentence. However, if the result of this test is negative, the process loops back to the beginning point to secure a new word from the target word list and which new word has the same first letter or character as does the new word from the window on the manuscript.

Figure 7:
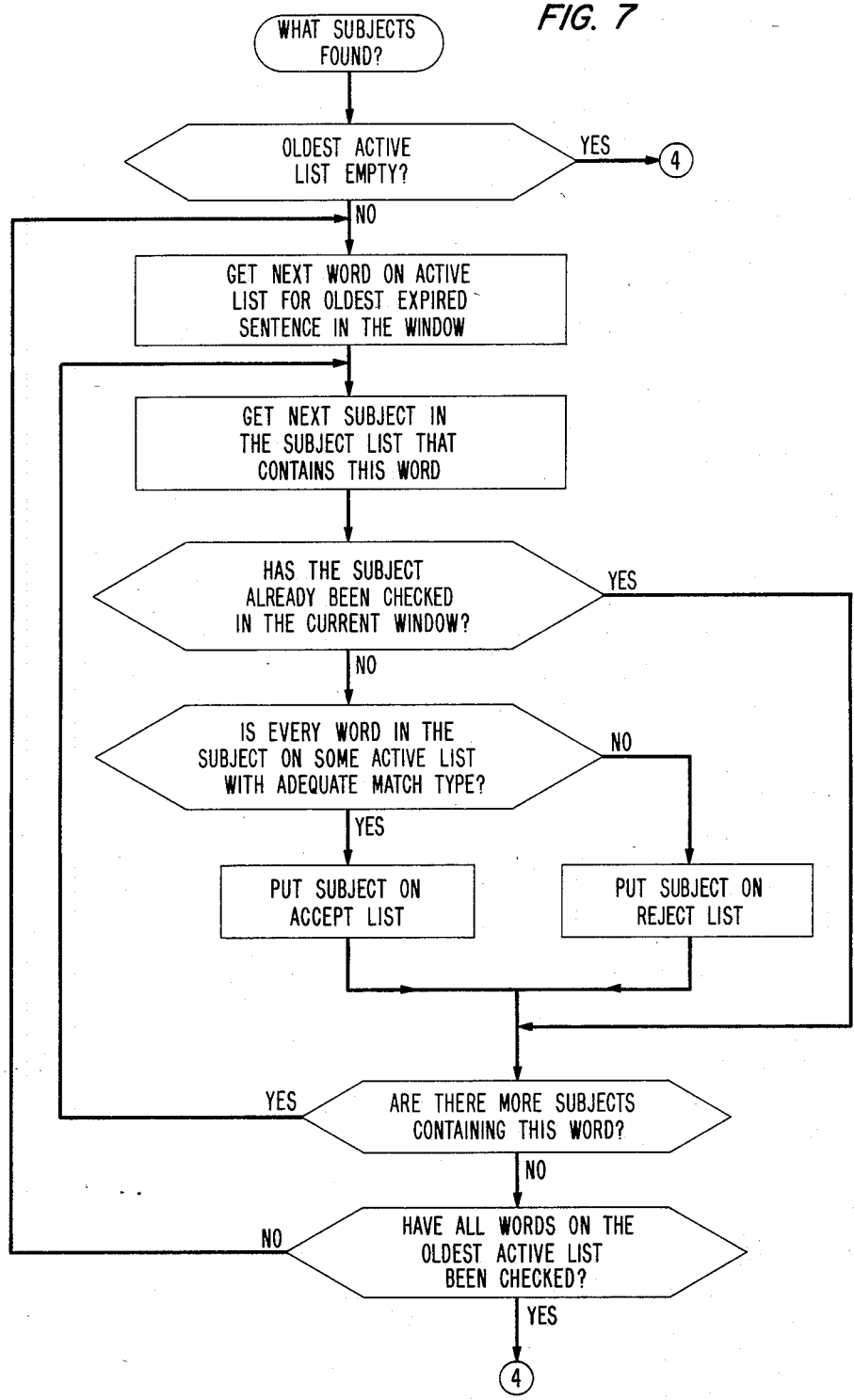

FIG. 7 illustrates the step from the process of FIG. 3 for determining what subjects have been found in the current window on the manuscript. At this point in the overall process for locating subjects in a manuscript, an updated manuscript window has been scanned; and all of its words have been compared to words on the target list. Those found on the target list have been activated in terms of those found exactly by literal match, by case match, or by either an exact or an approximate root match. It is now necessary to assess the findings held in the active list portion relating to only the oldest one of the n-sentence in the window on the manuscript.

Initially, if the active list for the oldest sentence is empty, the process returns to point 4 in FIG. 3. Otherwise, the first step is to get the next, or first, word on the active list for the oldest sentence in the window. Next, the process gets the first, or next, subject in the subject list that contains this particular word. This is achieved by going to the target word list field 18 at the entry for the word just identified on the active list, and taking the first, or next, pointer associated with that target list word, the pointer being to a subject on the subject list. Next, the "checked?" flag, associated with the next subject just identified, is checked to determine whether or not this subject has previously been checked in the current window. If it has, the process jumps ahead to a test to determine whether or not there are more subjects containing this same target word list word.

However, if the subject has not already been checked in the current window, a further test step is carried out to determine whether or not every other word in the subject just identified has an appearance on one or more of the parts of the active list field 17 in FIG. 2. This is accomplished by taking the pointer to each word of the subject, and checking to see if the word has been matched in the current window, i.e., checking to see if the match type of the target list word is set to something other than "none." If the word has been matched, the match type of the target list word is checked to see if it is adequate for the subject. That is, the rank of the match type of the target word must be equal to or greater than the rank of the match required by the subject, and specified in the subject word list field 17. If a word of the subject is found, which has not been matched in the current window, or the match type is inadequate, the process then places that subject in a reject list field 21 in FIG. 2, and sets the "checked?" flag for this subject in the subject list 17 to indicate that the subject has been checked in connection with the current window on the manuscript.

If the subject word match produced an affirmative result, the subject is placed on an accept list field 22 in the memory map of FIG. 2; and, again, its flag is set to indicate that this subject has been checked in connection with the current window on the manuscript.

Following the placement of a subject on either the accept list or the reject list, the process tests to determine whether or not there are more subjects containing the present target list word; that is, the process checks to see whether or not there are additional pointers to the subject list associated with the word presently under consideration on the target word list. If this test is affirmative, indicating that there are more subjects, then the process loops back to secure the next subject identified by the next pointer associated with the word on the target word list.

If the additional subject test produces a negative result, the process then makes a further test to determine whether or not all words on the oldest sentence portion of the active word list in field 19 in FIG. 2 have been checked. If not, the process loops back to obtain the next word on the active word list for the oldest sentence, and proceeds with the operations just described. However, if all words on the oldest active list portion have been checked, the process returns to the point 4 in FIG. 3 to output the subjects found in this current window.

Although the present invention has been described in connection with a particular embodiment thereof, additional embodiments, applications, and modifications, which will be obvious to those skilled in the art, are included within the spirit and scope of the invention.

What is claimed is:

1. An automated method for locating in a textual manuscript the subjects of a list of subjects, said method comprising the steps of
    deciding for each word of a predetermined segment of text whether or not it is contained in any word position in at least one subject of said subject list,
    determining for each subject containing a segment word whether or not all other words of said each subject are contained in a portion of said manuscript of predetermined size, and including at least the same segment,
    recording a subject, found in said determining step to have all of its words in a segment, with an indication of the location of such subject and segment in said manuscript, and
    repeating said deciding, determining, and recording steps for at least partially different segments of text.

2. The subject-locating method in accordance with claim 1 in which said recording step comprises the steps of
   providing a text processing system paging command for associating a manuscript page number with a selected subject referenced by said command, and
   storing with each segment both each subject located therein and a copy of said paging command.

3. The subject-locating method in accordance with claim 1 in which there is included a segment-selecting step comprising
   reading a character of said manuscript,
   testing said character to establish whether it is a type of character either indicating a text word or indicating an effective end of an n-sentence segment,
   providing each text word, established in said testing step, to said deciding step, and
   interrupting said providing step, in response to an end-of-segment character, and transferring from said deciding step to said determining step.

4. The subject-locating method in accordance with claim 1 in which there is included a segment-selecting step comprising the steps of
   reading a token portion of said text manuscript, and
   testing said token portion to determine which of predetermined plural types it represents, and
   if said token is a word, executing said deciding step,
   if said token is an end-of-sentence token, testing whether n sentences have yet been read, and, if not, get a new token, but, if true, go to said determining step,
   if said token is a heading or a paragraph token, go to said determining step, and
   if said token is an end-of-manuscript-file token, set an end-of-file flag to stop said repeating step, and go to said determining step.

5. The subject-locating method in accordance with claim 1 in which each subject of said list has a match-type indicator specifying at least one predetermined degree of specificity required for word match operations used to locate the subject in said manuscript,
   said deciding step includes the steps of
   comparing each manuscript word to words of subjects of said subject list, each comparison including successive matching operations of different specificity types, and
   recording for each match operation that produces an affirmative result both the manuscript word involved and the type of match used to produce that result, and
   said determining step includes the step of
   accepting for said subject recording step those subjects for which all subject words recorded in said word recording step have match-types at least as specific as a match-type required by the subject to be accepted for the corresponding subject word.

6. The subject-locating method in accordance with claim 1 in which said deciding step comprises the steps of
   constructing a target word list containing only once each word of any subject of said subject list,
   activating each target word which is included in said segment of text, said activating function comprising the step of storing a pointer to such target word in an active word list, and
   providing said each target word activated in said activating step as input to said determining step.

7. The subject-locating method in accordance with claim 6 in which
   said constructing step includes the step of storing each target word with a pointer to each subject of said subject list including said each target word, and
   said determining step comprises the steps of
   selecting a word from said active word list,
   finding a corresponding word on said target word list and selecting an associated pointer to said subject list,
   testing the pointed subject for the presence of all words thereof on said active list and marking the tested subject with its test result,
   repeating the step of testing for any other subjects that are pointed from the same target list word, and
   repeating the steps of selecting, finding, testing, and repeating testing for each word of a portion of said active list for a sentence of said segment.

8. The subject-locating method in accordance with claim 6 in which said activating step comprises the steps of
   testing each word of said segment which is not in said target list for uppercase letters, and if any, converting such word to all lowercase letters,
   if the lowercase word form just produced in said converting operation is on said target list, storing a pointer to such target word in said active word list,
   screening each word of said segment to identify words having a predetermined high-indexing-significant suffix,
   discarding said suffix,
   testing each word of said segment to determine whether or not its root at least approximately matches a target list word root, and
   activating any target word so matched.

9. The subject-locating method in accordance with claim 8 in which said root-activating step comprises the steps of
   testing said target list for a word having the same first alphabetic character as said word root of said root-match-testing step, and if a same-first-letter word is not found, return to said deciding step, but, if found, testing for at least an approximate root match between said word root and said target list same-first-letter word,
   activating said target word if a match is found in said step of testing for at least an approximate root match, and
   whether or not an at least approximate root match occurred, loop back to the step for testing said target list for an additional word having the same first alphabetic character as said word root.

10. The subject-locating method in accordance with claim 9 in which said testing for an at least approximate root-word-matching step comprises the step of
    identifying the shorter one of the roots and testing whether or not it is at least a predetermined number of characters in length, and
    if the shorter root has at least the minimum length, testing for a match between (a) the shorter root and (b) the first N−1 characters of the other of the two roots, where N is the total number of characters of the longer word.

11. A method for locating in a given body of text subjects of a given subject list including at least one multi-word subject, said method comprising the steps of successively selecting at least partly different n-sentence segments of said text, where n is at least 1, as to each word of a sentence of a selected segment, first determining whether or not such word is included in any one or more of said subjects, and second determining, as to each subject in which an included word is found in said first determining step, whether or not all words of said each subject at least approximately match a word in said selected segment, discontinuing said second determining step for a selected segment as to any said each subject for which a word is not found in said selected segment, and associating with each subject, found in said first and second determining steps to be in said selected segment, an indicator of its location in said body of text.

12. The method in accordance with claim 11 in which words are matched by a literal type of matching process or a less specific type of matching process, at least one subject includes a requirement that a literal match be used to consider that it has been found in said text, and said first determining step includes the steps of using either matching type to determine whether or not said each word is included in any one or more of said subjects, said second determining step further includes the step of determining as to each subject whether or not matching types used in said first determining step and in this second determining step are at least as specific as a match type required by said each subject, and said discontinuing step further includes the step of discontinuing said second determining step for a selected segment as to any said each subject for which matching types in said first and second determining steps are not at least as specific as a match type required by said each subject.

* * * * *